No. 804,253. PATENTED NOV. 14, 1905.
O. A. MYGATT.
REFLECTOR SHADE FOR ARTIFICIAL LIGHTS.
APPLICATION FILED NOV. 16, 1903.
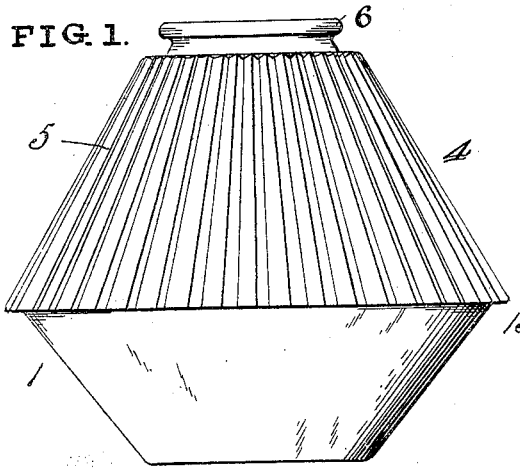
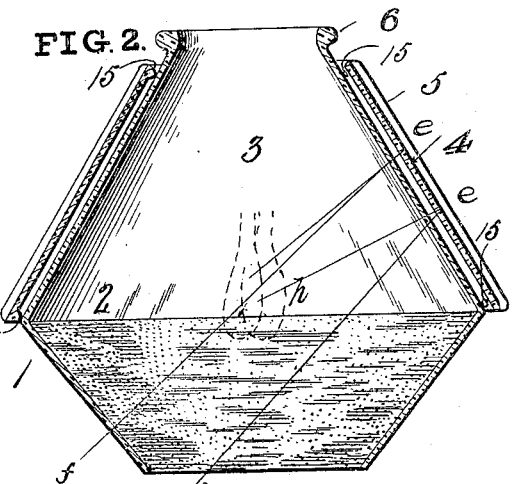
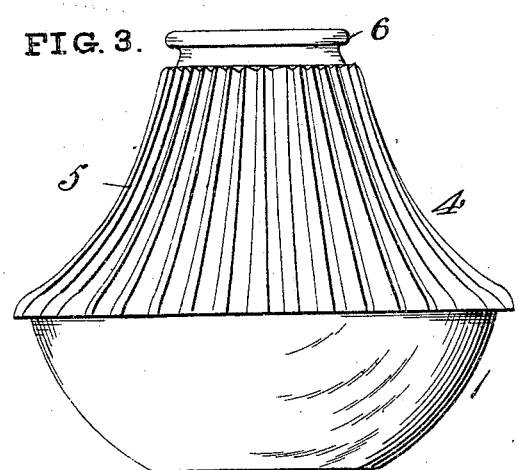
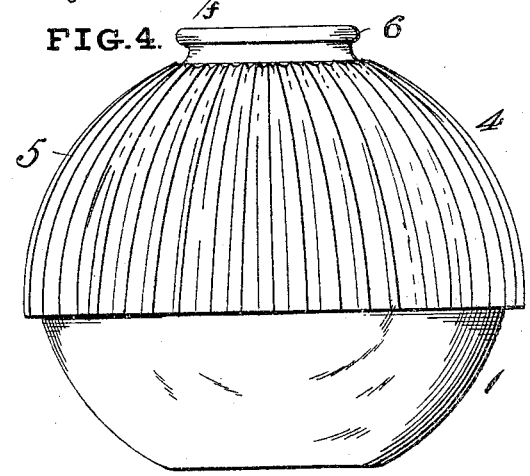
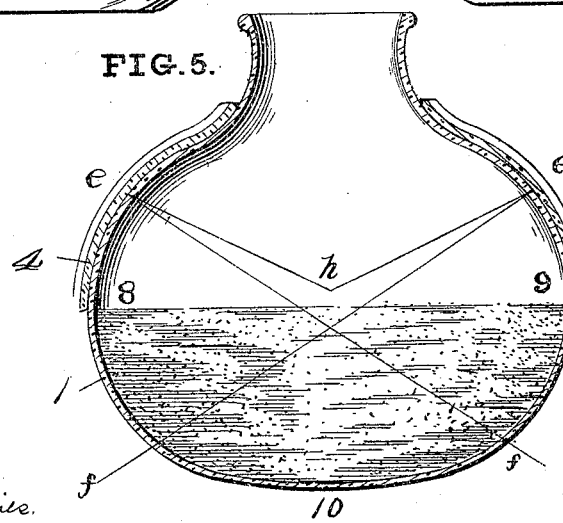
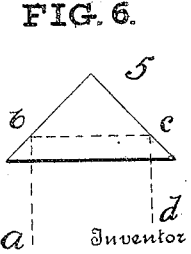

UNITED STATES PATENT OFFICE.

OTIS A. MYGATT, OF NEW YORK, N. Y.

REFLECTOR-SHADE FOR ARTIFICIAL LIGHTS.

No. 804,253.    Specification of Letters Patent.    Patented Nov. 14, 1905.

Application filed November 16, 1903. Serial No. 181,322.

*To all whom it may concern:*

Be it known that I, OTIS A. MYGATT, a citizen of the United States, residing at New York, in the county of New York and State of New York, have invented certain new and useful Improvements in Reflector-Shades for Artificial Lights, of which the following is a specification, reference being had therein to the accompanying drawings.

This invention relates to combination glass reflectors for artificial lights, such being composed in part of prismatic glass and in part of diffusion-surfaces on the glass support thereof.

The object of the invention is to produce a shade-reflector of glass, in whole or in part composed of layers and in which the main part of the reflection of light-rays which would otherwise escape upwardly or in other than useful direction shall be effected by double-reflecting prisms, as will be explained, while the diffusion of light which would otherwise be too intense in downward or desired direction shall be effected by ground-glass or similar surfaces, avoiding waste of light-rays in any direction.

A further object is to decrease the weight of prism-glass reflectors from what has hereto prevailed.

The invention consists in mechanical constructions and combinations of elements, as will be explained and claimed herein.

Figure 1 is a side elevation of a shade-reflector composed in part of pressed glass which is prismatic externally and in part of a plain blown-glass supporting-body. Fig. 2 is a section of a shade, showing the two parts of which it is composed separated. Fig. 3 is an elevation of a modified form. Fig. 4 is still another modification. Fig. 5 is a section of a reflector-globe with closed bottom, indicating some lines of light radiation and reflection.

Prism-glass globes, shades, or reflectors in practice must be pressed in a mold. The glass is molded in a condition of plasticity which does not permit it to flow as would a liquid. A large article of pressed glass must be considerably thicker in proportion than a smaller one, as the glass refuses to flow easily from a central mass to the extremes of a mold. A pressed prism-glass globe of the form shown in Fig. 1 would be difficult, if not impossible, of construction, as such a globe must be molded with one end open for the withdrawal of the plunger and the open end afterward drawn in by a hand tooling process, involving much skilled labor, the distortion of prisms, &c. To overcome the difficulties heretofore existing, I make the body or reflector-support 1 of blown glass. This support is suitably connected to a lamp or light. As glass can be blown, in a mold or otherwise, to almost any form (especially where there are no sharp angles) and can be made quite thin, this supporting-body 1 may be of almost any desirable form for inclosing an artificial light and may be open at one or both ends, as desirable. In Fig. 1 the body 1 is practically in form of two frustums of cones joined at their bases. The lower part of this supporting-body 1 may be frosted by being ground or etched or otherwise provided with a diffusing-face to give a ground-glass diffusing-surface, say, below the median line 2, the upper portion 3 of body 1 being left plain and smooth on both surfaces. Over the upper part of body 1 I place a prismatic jacket, petticoat, or cover 4. This cover is wholly or substantially covered externally by prisms 5, which in length extend from about the upper to the lower edge of the petticoat or jacket and are what I call "double-reflecting" prisms of the character indicated in Fig. 6. In such figure, $a$ is supposed to represent the source of a light-ray; $b$, the first plane of reflection; $c$, the second plane, and $d$ the line of complete reflection or return of the ray. The theory of such reflection is further explained in my Patent No. 736,535, August 18, 1903, and in the patent of Blondel *et al.*, No. 563,836, July 14, 1896.

In pressed-glass reflectors made integral much difficulty has been experienced in forming the collar by which the reflector or shade is supported. By making the body of blown glass, with collar thereon, the collar 6, of whatever form, is made much lighter and can more readily be brought to shape.

The supporting-body 1, of blown glass, may be of almost any form. The prismatic jacket 4, of pressed glass, will generally be supported thereby and will be above the same or remote from the source of light. The terms "above" and "below" are used relatively in this connection, as the lamp or source of light and the reflector may be turned to any position, so as to reflect light in any direction.

Supposing the form indicated in Fig. 5 to be adopted and the lower portion 8 9 10 to be finished in ground glass, the prismatic jacket 4 being applied, then if $h$ indicates the center of light the line *h e* will indicate some of the lines of incidence, and the lines *e f* the lines of reflection, and the reflected as well as the directly-transmitted light passing out through the ground-glass portion 8 9 10 of body 1 will be diffused and softened by the ground surface thereof. The ground glass is of itself to some extent a reflector, and the light-rays reflected by it will be almost entirely toward the reflecting-petticoat 4 and will be returned again to and generally through the ground-glass diffusing-face.

In some instances the jacket 4 may be constructed with internal bosses 15, by which it will be prevented from coming in close contact with the body 1, an intervening ventilating air-space being thus provided, or the bosses might be on the body 1 with like result.

In Fig. 2 the lines *h e f* show that some of the reflected rays pass through the ground glass and some through the open bottom of the shade.

By the construction described glass shade-reflectors of large size can be made much lighter than heretofore for the reason that the prismatic reflecting portion does not occupy the full surface of the compound structure, but only the reflector portion thereof, and, as has been explained, the thickness of pressed-glass articles necessarily increases very rapidly with increase of size. Thus if the body 1 of the support shown in Fig. 5 were of pressed glass integral with the prismatic reflector 4 said body portion, by reason of the limitations of the glassworker's art, would be several times thicker and heavier than it need be if made of blown glass, and while being much more expensive would also obstruct the passage of light in much greater degree.

I claim—

1. The combination with a thin smooth supporting-body of glass, adapted to surround a lamp and independent thereof, of a second glass body conforming closely to the first and resting thereon, and having a generally smooth interior face and external prisms adapted to reflect light-rays originating within the supporting-body back into the same.

2. The combination with a thin supporting-body of glass, adapted to surround a lamp and independent thereof, said body having its upper portion transparent and its lower portion frosted, of a glass reflector conforming closely to the transparent part of said body, and having external prisms adapted to reflect light-rays from within the body back into the same and out through the frosted part thereof.

3. A supporting-body of blown glass adapted to substantially surround a lamp and independent thereof, said body provided in part with a frosted surface and in part with a transparent portion, combined with a prismatic jacket of pressed glass covering the transparent portion of said body, and having external prisms arranged to reflect light-rays through the transparent portion and through the frosted portion of said body.

4. The combination of an electric-lamp globe with a reflector composed of prismed glass having a central opening to surround the base of the globe, said reflector conforming generally to the part of the globe adjacent to said base, and means interposed between said globe and reflector to provide an intervening air-space.

5. A thin supporting-body of glass provided with a collar at its upper end, a light-diffusing surface near its lower end and an intermediate smooth portion, combined with a glass jacket having external reflecting-prisms and substantially covering the smooth portion of said supporting-body.

In testimony whereof I affix my signature in presence of two witnesses.

OTIS A. MYGATT.

Witnesses:
H. E. NASON,
W. A. DOREY.